Patented July 16, 1946

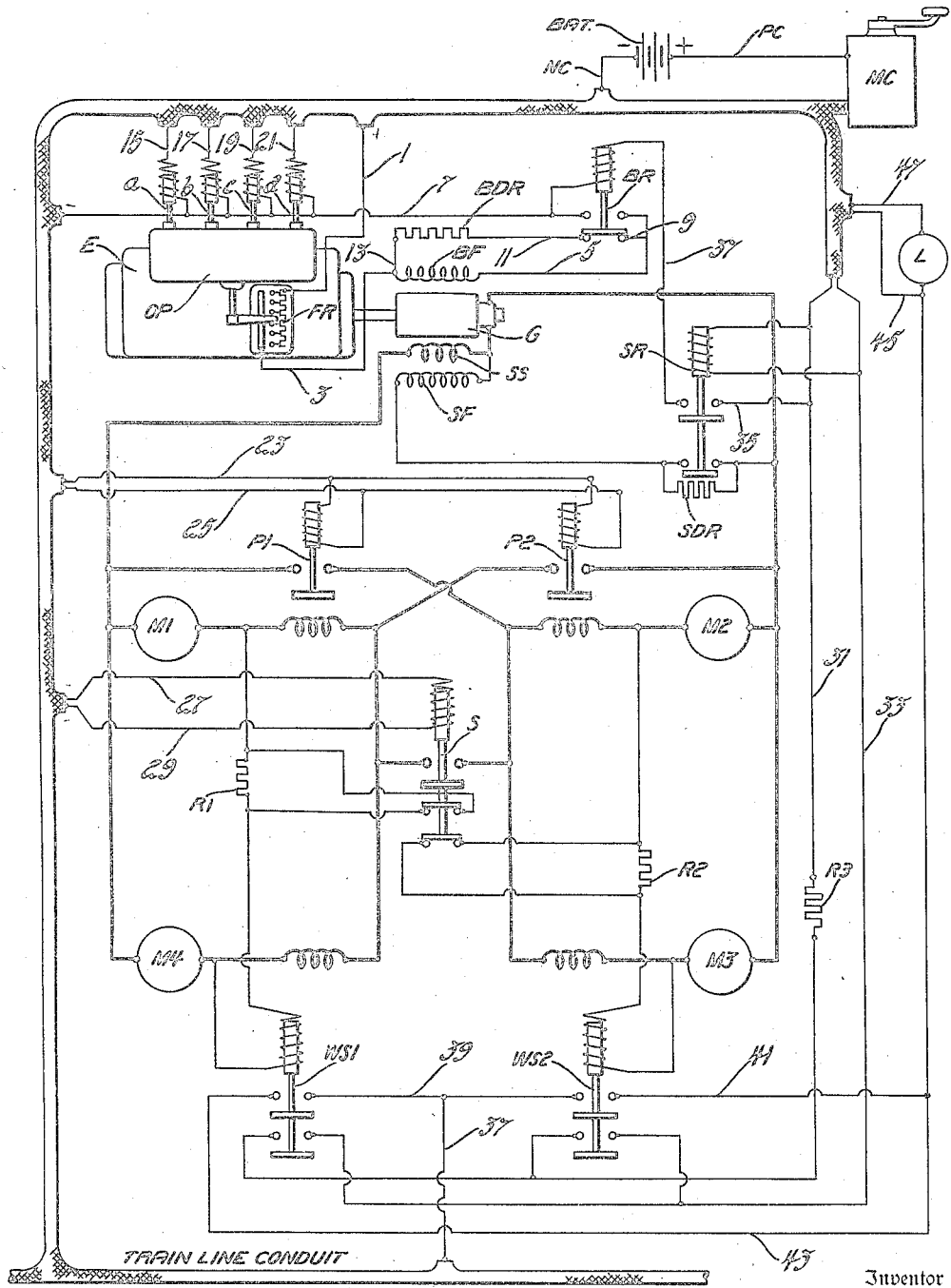

2,403,933

UNITED STATES PATENT OFFICE 2,403,933

GENERATING ELECTRIC DRIVE AND CONTROL SYSTEM

Torsten O. Liliquist, Clarendon Hills, Ill., assignor to General Motors Corporation, Detroit, Mich., a corporation of Delaware Application August 28, 1944, Serial No. 551,596

6 Claims. (Cl. 105—61)

The present invention generally relates to locomotive generating electric drive and control systems and more particularly relates to control means for checking slippage of locomotive driving wheels.

Wheel slippage checking control means are usually provided to prevent wheel slip when the locomotive traction motors are connected in a starting power circuit relation with the power source as the motors then exert high torque to the traction wheels and wheel slippage is most liable to occur. It has been found, however, that wheel slippage frequently occurs when the traction motors are connected in high speed operating circuit relation with the power source, especially on uneven track and when the track is wet or covered with leaves.

The object of the present invention is to provide simple control means which act automatically in response to slight variations in speed between the traction wheels and motors when the motors are connected in either starting or high speed running circuit relations to cause a drastic reduction in the power supplied to the motors and thereby check incipient wheel slippage.

The novel control means by which the above object of the present invention is accomplished will become apparent by reference to the following detailed description and single drawing illustrating, in diagrammatic form, a generating electric drive and control system for a locomotive embodying my simplified control means which act automatically to check incipient slippage of the locomotive traction wheels at low and high operating speeds thereof.

The locomotive generating electric drive and control system, illustrated diagrammatically, includes a power plant comprising a prime mover E, of the Diesel type, and an electric generator G for supplying power to a plurality of series type traction motors M1 to M4 operatively connected in conventional manner to separate locomotive driving axles provided with a pair of traction wheels, not shown. The generator and motors are included in a power circuit which includes switching means for causing the motors to be connected in slow speed starting or high speed running power circuit relations with the generator.

The switching means includes electromagnetic contactors S, P1 and P2 which are controlled by a manually operable master controller MC which also serves to control speed load and output regulating means, indicated generally at OP, for the power plant which will be subsequently described.

Each of the contactors S, P1 and P2 includes an actuating winding, and armature having a contact movable thereby into bridging relation with a pair of normally open power contacts to which the power conductors are connected, so that upon closure of the contacts of the contactor S the motors will be connected in series-parallel or starting circuit relation with the generator and when the contacts of the contactors P1 and P2 are closed the motors will be connected in parallel or high speed running circuit relation with the generator, as it will be noted that pairs of motors are permanently connected in parallel by certain of the power conductors.

The series contactor S is also shown provided with two pairs of stationary interlocking contacts which are normally closed by separate armature contacts and are opened when power contacts are closed to connect the motors in series parallel power circuit relation. Current limiting resistors R1 and R2 are shown respectively connected across a separate pair of normally closed interlocking contacts of the series contactor S so that the resistors are normally shunted. Each of these resistors are shown connected in series relation with the winding of a wheel slip relay between the power circuit conductors shown connecting the armature and series field winding of each of the motors permanently connected in parallel. The wheel slip relays are identical and are indicated at WS1 and WS2. Each of these relays is provided with two pairs of stationary contacts which are normally open and are closed by relay armature contacts upon energization of the relay winding. It will be evident that as each relay winding is connected in series with a current limiting resistor directly between the motors connected permanently in parallel in the manner described, the winding of the relay will be energized only by circulation of current between these motors upon a variation or unbalance in C. E. M. F. between the motors resulting from a variation in speed and torque between the motors caused by slippage of the wheels driven by one of these motors. Each pair of parallel connected motors is connected in series power circuit relation with the generator for causing the motors to exert high torque to the respective driving axles and traction wheels in order to cause starting and low speed of operation of the locomotive by closure of the power contacts of the series contactor S. As explained, when the power contacts of the relay S close, the interlocking contacts thereon open thereby causing the current limiting resistor R1 to be inserted in series with the winding of the wheel slip relay WS1 and the current limiting resistor R2 to be inserted in series with the winding wheel slip relay WS2. This is done to reduce the sensitivity of each of these wheel slip relays which are adapted to operate upon very low values of current in the winding thereof. When the motors are started and operated at low speed more current will circulate between the motors of each parallel connected pair upon slippage of the wheels driven by one motor than when they are operated at high speed for the reason that the speed differential between the motors driving respective axles and pairs of wheels is greater at low speeds than at high speeds and accordingly the differential or unbalance in C. E. M. F. between the motors and therefore the current circulating therebetween is higher. The wheel slip relays WS1 and WS2 are thus protected against overload current circulating between each pair of motors when the motors are connected in series-parallel starting circuit relation with the generator upon starting of the motors.

The arrangement of the control connections, shown in lighter lines on the drawing interconnecting the speed, load and output regulating means OP and control relays BR and SR of the prime mover generator power plant and the traction motor switching means S, P1 and P2 enables the traction motor power connections to be changed and the power output supplied to the motors to be selectively controlled by the master controller to render the wheel slip relays WS1 and WS2 operative to act automatically upon slippage of any of the traction wheels to cause a drastic reduction in the power supplied to the motors thereby to check incipient wheel slippage.

The master controller MC is connected to the positive terminal of a battery BAT by a positive control conductor PC and suitable contacts, not shown, are provided in the controller to control energization of the power plant output regulating means OP and relays BR and SR associated therewith through suitable train line conductors included in a train line conduit and connected to the controller contacts. A negative train line conductor NC is connected to the negative battery terminal and extends into the train line conduit.

The power plant speed, load and output regulating means OP is of conventional type including a speed responsive governor driven by the prime mover E for adjusting the fuel supplied to the prime mover and a field rheostat FR included in a separately excited generator field circuit in order to cause operation of the power plant at substantially constant speed, load and output in conventional manner. The governor is provided with electromagnetic means $a$, $b$, $c$ and $d$ for varying the speed response of the governor to cause operation of the engine at any one of a plurality of preselected constant values of speed, load and output. The generator G is provided with series, shunt and separately excited field windings SS, SF and BF, respectively. The series field winding SS is shown connected in series with the generator armature in the power circuit. The shunt field winding is shown connected in series with one of the normally open pair of contacts of the relay SR across the generator armature. A shunt field discharge resistor SDR is connected across these normally opened relay contacts and is accordingly normally connected in series with the shunt field winding to reduce the excitation current therein to a low value. The separately excited field winding BF is shown connected by conductors 1, 3, 5 and 7 in series with the field rheostat FR of the power plant regulating means OP and the normally opened contacts of the relay BR. The conductor 1 is connected to a positive train line conductor and the conductor 7 is connected with the negative train line conductor NC. A field discharge resistor BDR is connected in series relation with the normally closed contacts of the relay BR between the conductors 3 and 5 by conductors 9, 11 and 13. It will be evident that with the contacts of the relay BR in the normal position, as shown, the separately excited field winding BF is disconnected from the positive and negative train line conductors and the discharge resistor BDR is shunted across this winding to cause prompt decay of the magnetic field from the separately excited field winding.

One terminal of the relay BR winding and one terminal of each of the windings of the electromagnetic means $a$, $b$, $c$ and $d$, operating the governor speed setting means, is connected to the conductor 7 which, as mentioned, is connected to the negative train line conductor NC, and each of the other winding terminals of the means $a$, $b$, $c$ and $d$ is separately connected to separate positive train line conductors by separate conductors 15, 17, 19 and 21. The windings of the parallel contactors are each connected between a separate positive train line conductor and the negative train line conductor by the conductors 23 and 25 and winding of the series contactor is connected by conductors 27 and 29 between another positive train line conductor and the negative train line conductor. The winding of the relay SR is connected between conductors 31 and 33. The conductor 31 is connected to a separate positive train line conductor and the conductor 33 is connected to the negative train line conductor NC. The winding of the relay BR is connected in series relation with the other normally open pair of contacts of the relay SR between the conductors 31 and 7 by conductors 35 and 37. The normally open upper pair of contacts of the wheel slip relays WS1 and WS2 are connected across the conductors 31 and 33 to cause the windings of the relays SR and BR to be shunted upon closure of either of these wheel slip relay contacts, a suitable current limiting resistor R3 being inserted in series with the conductor 31 between the windings of the relays BR and SR and the contacts of the wheel slip relays WS1 and WS2 in order to limit the current in the shunt connection across the relay windings. The other pair of normally opened contacts of the wheel slip relays are connected in parallel with one terminal of a wheel slip alarm light and a conductor 37, connected to another positive train line conductor, by conductors 39, 41 and 43. The conductor 43 is connected to a signal train line conductor by a conductor 45 and the other terminal of the alarm light is connected by a conductor 47 to the negative control conductor so that the signal train line conductor will be energized and the light will be illuminated by closure of either of these contacts of the wheel slip relays.

As explained the master controller is provided with suitable contacts which are manually operable to selectively connect the positive train line connectors with the positive control conductor PC in preselected combinations whereby the motors may be connected either in series-parallel starting circuit relation with the generator G or in parallel high speed running circuit relation with the generator and to control operation of the power plant at preselected constant values of speed, load and power output to vary the speed and torque of the motors when connected in either circuit relation. It will be evident that if the positive, negative and wheel slip signal train line conductors are connected in multiple with like conductors of other similar locomotive units they may be controlled and operated in multiple from any master controller on any locomotive unit.

Starting of one or more locomotive units is accomplished by movement of the master controller MC to a position causing energization of the windings of the series contactors S, relays BR and SR and certain of the electromagnetic means $a$ to $d$ of the speed, load and output regulating means OP of the power plant. Energization of the winding of the contactor S causes the closure of the power contacts and the opening of both pairs of interlocking contacts thereof. As explained this causes pairs of parallel connected motors to be connected in series across the generator G and also causes a reduction in the sensitivity of the wheel slip relays WS1 and WS2 by causing each of the relay windings to be connected in series with one of the limiting resistors R1—R2 directly between the motors of a parallel connected pair for energization by circulation of current therebetween upon slight differences in speed between the motors of each pair due to any slight slippage of the traction wheels on any axle driven by any motor of either pair of motors.

Energization of the winding of the relay SR through the conductors 31 and 33 causes closure of both pairs of contacts thereof. Closure of the lower pair of contacts causes the discharge resistor SDR to be shunted and the generator shunt field winding SF to be connected directly across the generator armature so that it receives full excitation current. Closure of the upper contacts of the relay SR causes energization of the winding of the relay BR through these closed contacts and conductors 31, 35, 37 and 7 to cause the opening of the lower contacts of the relay BR and the closure of the upper contacts. Opening of the lower contacts of the relay BR disconnects the field discharge resistor from the separately excited generator field BF and closure of the upper contacts of the relay BR causes energization of this field winding through conductors 1, 3, 5 and 7 and the field rheostat FR of the power plant regulating means OP.

Energization of certain of the electromagnetic means $a$, $b$, $c$ or $d$ through certain of the conductors 15, 17, 19 or 21 and the conductor 7 causes the governor speed response to be varied so that the fuel supplied the prime mover E and the rheostat FR to be operated by the governor of the output regulating means OP to cause operation of the prime mover generator power plant at a preselected constant value of speed, load and output. As the traction motors M1 to M4 are connected in series-parallel starting circuit relation with the power plant generator they will exert high torque on the wheels and cause acceleration and low speed operation of the locomotive.

Should the wheels driven by any traction motor start to slip, either of the wheel slip relay windings will be energized by circulation of current between either pair of parallel connected motors, the current being limited in value by a respective limiting resistor, and this causes closure of both pairs of contacts of either wheel slip relay.

Closure of the lower contacts of either wheel slip relay completes a shunt circuit around the windings of the relays SR and BR which causes the relay armature to drop to the normal position shown. With the relay armatures in the normal position the discharge resistor SDR is connected in series with the generator shunt field winding SF and the generator separately excited field winding BF is deenergized and connected across the discharge resistor BDR thereby causing a sudden decay in the generator field and a corresponding sudden reduction in the power output of the generator. This sudden reduction in output to the traction motors reduces the torque of the motors and checks wheel slip as soon as it starts. Closure of the upper contacts of either wheel slip relay causes energization of the signal train line conductor 45 through these contacts and conductors 37, 41, 43 to cause illumination of any wheel slip alarm lights L through the conductor 43 connected to the signal train line conductor 45 and the conductor 47 connected to the negative control conductor NC.

It will be evident that with the above arrangement as soon as wheel slip occurs the signal lights are illuminated and the power output to the traction motors is reduced and the wheel slip signal lights are illuminated by automatic energization and closure of either of the wheel slip relays to instantly check wheel slippage and this causes deenergization and the immediate opening of either wheel slip relay to cause power to be again supplied to the traction motors and deenergization of the signal lights.

Identical automatic operation of the wheel slip relays occurs when the traction motors are connected in parallel with the generator to instantly check wheel slippage and cause momentary illumination of the signal lights when the master controller MC is operated to cause energization and closure of the contacts of the parallel contacts P1 and P2 and simultaneous deenergization of the winding and the opening of the power contacts and closure of the interlocking contacts of the series contactors S. The current limiting resistors R1 and R2 are however shunted out of each of the winding circuits of the wheel slip relays when the interlocking contacts of the series contactor are closed so that the sensitivity of the wheel slip relays is increased so that either acts instantaneously for the smaller values of circulating current between the motors of each parallel connected pair and each pair is connected in parallel circuit relation with the generator to check wheel slippage.

I claim:

1. A traction system comprising pairs of traction motors, the motors of each pair being electrically connected in parallel, separate means electrically connected between the individual motors of each pair to detect any slight unbalance in electrical conditions and speed therebetween, means for modifying the sensitivity of each of said separate means, and switching means for connecting said pairs of motors in series or parallel power circuit relation and for rendering said sensitivity modifying means operative to change the sensitivity of said separate detecting means upon the establishment of one of said motor circuit relations and for rendering said sensitivity modifying means inoperative upon the establishment of the other of said circuit relations.

2. A traction system comprising pairs of traction motors, the motors of each pair being permanently connected in parallel, separate relays, each having a winding connected between the individual motors of a pair for energization upon any slight circulation of current between the motors of a pair due to unbalanced electrical conditions and speed between said motors to cause operation of the relay, sensitivity reducing means for the relays, and switching means operable to cause said pairs of motors to be connected in series or parallel power circuit relation and for rendering the sensitivity reducing means operative upon the establishment of the series power circuit relation of said pairs of motors.

3. A traction system for a locomotive having a plurality of traction wheels comprising a power plant, output regulating means therefor, a plurality of pairs of traction motors, the motors of each pair being connected in parallel and each motor driving a separate pair of locomotive traction wheels, separate control means for said power plant output regulating means and separate sensitivity reducing means for each of said control means, one control means and one sensitivity reducing means therefor being connected directly between the motors of one parallel connected pair, the other control means and other sensitivity reducing means therefor being connected directly between the motors of the other parallel connected pair, each of said control means being adapted to act automatically upon any slight unbalance in electrical conditions between the motors of a separate pair due to slight slippage of the wheels driven by any motor of a pair in order to control said power plant output regulating means and thereby restore the electrical and speed balance between the motors, and means for connecting pairs of motors in series or parallel power circuit relation with said power plant and for rendering said separate sensitivity reducing means for each of said control means inoperative when the parallel power circuit relation of said motors is established.

4. A traction system for a locomotive having a plurality of traction wheels comprising a prime mover generator power plant for the motors, output reducing means for the power plant, said motors being connected electrically in pairs with the motors of each pair connected in parallel relation and each motor driving a separate pair of traction wheels, separate relays each connected between the motors of each pair and capable of operating for any slight unbalance in electrical and speed conditions therebetween to control the output regulating means to prevent overspeeding of a motor of any pair of motors, means for reducing the sensitivity of each relay and means for connecting pairs of motors in series or parallel to establish a series-parallel or a parallel power circuit relation with the power plant and to render the relay sensitivity reducing means operative when the motors are connected in the series-parallel motor circuit relation.

5. A locomotive having a plurality of traction wheels, traction motors each adapted to drive individual traction wheels, a power plant for said motors, output regulating means for the power plant, manual means for controlling said output regulating means, means for connecting pairs of traction motors in parallel, separate automatic control means for said power plant output regulating means and sensitivity reducing means for each of said control means directly connected between the motors of each parallel connected pair, said automatic control means being adapted to act automatically upon any slight unbalance in the electrical conditions between the motors of each pair due to slight slippage of a wheel driven by either motor of any parallel connected pair in order to cause a reduction in the power output of said power plant independently of said manual control means thereby to instantly check wheel slippage and restore the electrical balance between the motors of each pair, and manually controlled switching means for causing pairs of parallel connected motors to be connected in series or parallel power circuit relation with said power plant and for controlling operation of said sensitivity reducing means for said automatic control means upon establishment of the motor series power circuit relation.

6. A traction system for a locomotive having a plurality of traction wheels, traction motors each adapted to drive pairs of traction wheels, means for electrically connecting pairs of traction motors in parallel, electrical means connected between the motors of each pair comprising automatic control means adapted to act automatically in response to any slight unbalance in electrical conditions between the motors and sensitivity reducing means for said automatic control means, a power plant for said motors, power plant output varying means, switching means for connecting pairs of parallel connected motors in series or parallel power circuit relation with said power plant and for rendering inoperative said sensitivity reducing means for said automatic control means when said motors are connected in parallel circuit relation, a manually operable master controller for controlling said power plant output regulating means and said switching means, train line connections leading from said master controller and adapted to be connected in multiple with similar output regulating control means and switching means of other locomotives for multiple control by said master controller, a wheel slip indicator adjacent said master controller, control connections between said output regulating means, said wheel slip indicator and said automatic control means to cause operation thereof independently of said master controller upon slight unbalance in electrical conditions between any pair of traction motors caused by slippage of any pair of traction wheels in order to automatically restore the balance in electrical conditions and check wheel slippage and an indicator train line connection connected to said indicator and automatic control means, said indicator train line connection being adapted to be connected to other indicators on other locomotive units for multiple control by said automatic control means.

TORSTEN O. LILLQUIST.